US011604558B2

(12) United States Patent
Ono

(10) Patent No.: US 11,604,558 B2
(45) Date of Patent: Mar. 14, 2023

(54) DISPLAY CONTROL DEVICE, DISPLAY CONTROL METHOD, AND STORAGE MEDIUM

(71) Applicant: TOYOTA JIDOSHA KABUSHIKI KAISHA, Aichi-ken (JP)

(72) Inventor: Yushiro Ono, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/123,106

(22) Filed: Dec. 16, 2020

(65) Prior Publication Data

US 2021/0216193 A1 Jul. 15, 2021

(30) Foreign Application Priority Data

Jan. 14, 2020 (JP) ............................ JP2020-003978

(51) Int. Cl.

*G06F 3/0481* (2022.01)
*G06F 3/04817* (2022.01)
*B60K 35/00* (2006.01)

(52) U.S. Cl.

CPC .......... *G06F 3/04817* (2013.01); *B60K 35/00* (2013.01); *B60K 2370/119* (2019.05)

(58) Field of Classification Search

CPC .............. B60K 35/00; B60K 2370/119; G06F 3/04817

See application file for complete search history.

(56) References Cited

U.S. PATENT DOCUMENTS 8,769,431 B1 * 7/2014 Prasad .................. G06F 3/0488 715/764
10,180,767 B2 * 1/2019 Lee ....................... G06F 3/0486
2014/0108978 A1 * 4/2014 Yu ....................... G06F 3/04817 715/765
2014/0201655 A1 * 7/2014 Mahaffey ............ G06F 3/04817 715/765
2016/0048295 A1 * 2/2016 Mao .................... G06F 3/04817 715/719
2016/0139741 A1 * 5/2016 Sakai .................. G06F 3/04883 715/841

(Continued)

FOREIGN PATENT DOCUMENTS

JP 201489590 A 5/2014
JP 201569230 A 4/2015

(Continued)

*Primary Examiner* — Christopher E Leiby

(74) *Attorney, Agent, or Firm* — Hauptman Ham, LLP

(57) ABSTRACT

A display control device comprising a display control section configured to arrange, on a display, icons for starting each of a plurality of applications, an acquisition section configured to acquire a number of times of use for each of the applications; and a computation section configured to compute a priority level for each of the applications based on a condition including the number of times of use as acquired by the acquisition section, the display control section being configured to effect a rearrangement, in a prescribed region of the display section, each icon having a high ranking for the priority level computed by the computation section, and, during the rearrangement, being configured to fix a display position of icons remaining in the prescribed region.

20 Claims, 14 Drawing Sheets

(56) References Cited

U.S. PATENT DOCUMENTS

2017/0083711 A1* 3/2017 Hemaraj ............... G06F 3/0482
2017/0277398 A1 9/2017 Ishibashi et al.
2019/0042066 A1* 2/2019 Kim ...................... G06F 1/1649
2019/0182371 A1* 6/2019 Ashall ............... H04M 1/72481
2021/0200391 A1* 7/2021 Xiao .................. G06F 3/04817

FOREIGN PATENT DOCUMENTS

JP 2017173989 A 9/2017
JP 2018190154 A 11/2018

* cited by examiner

12
VEHICLE
20
DISPLAY CONTROL DEVICE
20B
ROM
200
CONTROL PROGRAM
210
APPLICATION PROGRAM
20F
INPUT/OUTPUT I/F
22
TOUCH PANEL
20G
20A
CPU
20C
RAM
20E
COMMUNICATION I/F

DISPLAY CONTROL DEVICE, DISPLAY CONTROL METHOD, AND STORAGE MEDIUM

CROSS-REFERENCE TO RELATED APPLICATION

This application claims priority under 35 USC 119 from Japanese Patent application No. 2020-003978 filed on Jan. 14, 2020, the disclosure of which is incorporated by reference herein in its entirety.

BACKGROUND

Technical Field

The present disclosure relates to a display control device, a display control method, and a program for displaying icons for applications on a display section.

Background Art

Japanese Patent Application Laid-Open (JP-A) No. 2015-069230 discloses a portable terminal device that changes a method for displaying an application icon in response to usage situations of a user. In this portable terminal device, priority levels are allocated to applications based on a condition including an execution history of the respective applications, and the arrangement of icons to be displayed on a display is determined based on these priority levels.

However, when icon arrangement is determined based on priority levels, the arrangement of applications on the display will be changed each time a priority level allocated to the respective applications is changed, and there is accordingly a concern that this may annoy the user.

SUMMARY

An object of the present disclosure is to provide a display control device, a display control method, and a program capable of suppressing changes to arrangement on a display section accompanying a change in priority level in cases in which the arrangement on the display section of icons for applications is changed according to the priority level allocated to each application.

A display control device of a first aspect includes a display control section configured to arrange on a display section icons for starting up each of plural applications, an acquisition section configured to acquire a number of times of use for each of the applications, and a computation section configured to compute a priority level for each of the applications based on a condition including the number of times of use as acquired by the acquisition section. The display control section is configured to rearrange in a prescribed region of the display section each icon having a high-ranking for the priority level computed by the computation section, and during this rearrangement to fix a display position of icons remaining in the prescribed region.

The display control device of the first aspect is applied to cases in which icons for starting up each of plural applications are arranged on a display section. In the display control device the computation section computes a priority level for each of the applications based on a condition including the number of times of use for each application as acquired by the acquisition section. The "condition" may include, in addition to the number of times of use for the application, factors such as whether or not the application is subject to history management, and whether or not the icon is an essential display icon. In the display control device, the display control section rearranges in the prescribed region of the display section each icon having a high-ranking priority level, and during this rearrangement fixes a display position of icons remaining in the prescribed region. The display control device thereby enables changes to be suppressed in the arrangement on the display section accompanying changes in priority level.

A display control device of a second aspect is the display control device of the first aspect, wherein based on a prescribed operation the display control section is configured to perform control so as to fix an icon subjected to the prescribed operation so as to be fixed in the prescribed region irrespective of the priority level of the icon.

The display control device of the second aspect fixes an icon in the prescribed region based on the prescribed operation thereon, thereby enabling an icon that a user needs to be displayed to always be displayed in the prescribed region even when there is a low usage frequency. This enables an icon display mode to be implemented that is tailored to the preferences of the user.

A display control device of a third aspect is the display control device of the first or second aspect, wherein based on a prescribed operation the display control section is configured to perform control so as to remove an icon subjected to the prescribed operation from the prescribed region irrespective of a priority level of the icon.

The display control device of the third aspect removes an icon from the prescribed region based on the prescribed operation thereon, thereby enabling an icon that a user does not need to be displayed to always not be displayed in the prescribed region even when there is a high usage frequency. This enables an icon display mode to be implemented that is tailored to the preferences of the user.

A display control method of a fourth aspect includes an arranging step of arranging on a display section icons for starting up each of plural applications, an acquisition step of acquiring a number of times of use for each of the applications, a computation step of computing a priority level for each of the applications based on a condition including the acquired number of times of use, and a rearranging step of rearranging in a prescribed region of the display section each icon having a high-ranking for the computed priority level, and during the rearranging fixing a display position of icons remaining in the prescribed region.

The display control method of the fourth aspect is applied to cases in which icons for starting up each of plural applications are arranged on a display section. In the display control method the priority level is computed for each of the applications based on a condition including the acquired number of times of use for each application. The factors included in the "condition" are as stated above. In the display control method, each icon having a high-ranking priority level are rearranged in the prescribed region of the display section, and during this rearrangement a display position is fixed for icons remaining in the prescribed region. The display control method thereby enables changes to be suppressed in the arrangement on the display section accompanying changes in priority level.

A program of a fifth aspect is a program to cause a computer to execute processing. The processing includes an arranging step of arranging on a display section icons for starting up each of plural applications, an acquisition step of acquiring a number of times of use for each of the applications, a computation step of computing a priority level for each of the applications based on a condition including the acquired number of times of use, and a rearranging step of rearranging in a prescribed region of the display section each icon having a high-ranking for the computed priority level, and during the rearranging fixing a display position of icons remaining in the prescribed region.

The program of the fifth aspect is applied to cases in which icons for starting up each of plural applications are arranged on a display section by a computer. Namely, in the computer executing the program, the priority level is computed for each of the applications based on a condition including the acquired number of times each application is used. The factors included in the "condition" are as stated above. In the computer, each icon having a high-ranking priority level are rearranged in the prescribed region of the display section, and during this rearrangement a display position is fixed for icons remaining in the prescribed region. The program thereby enables changes to be suppressed in the arrangement on the display section accompanying changes in priority level.

The present disclosure enables changes to be suppressed in the arrangement on the display section accompanying changes in priority level in cases in which icons for each application are arranged on the display section according to priority levels applied to each application.

BRIEF DESCRIPTION OF DRAWINGS

Exemplary embodiments of the present invention will be described in detail based on the following figures, wherein.

DESCRIPTION OF EMBODIMENTS

Configuration

Figure 1:
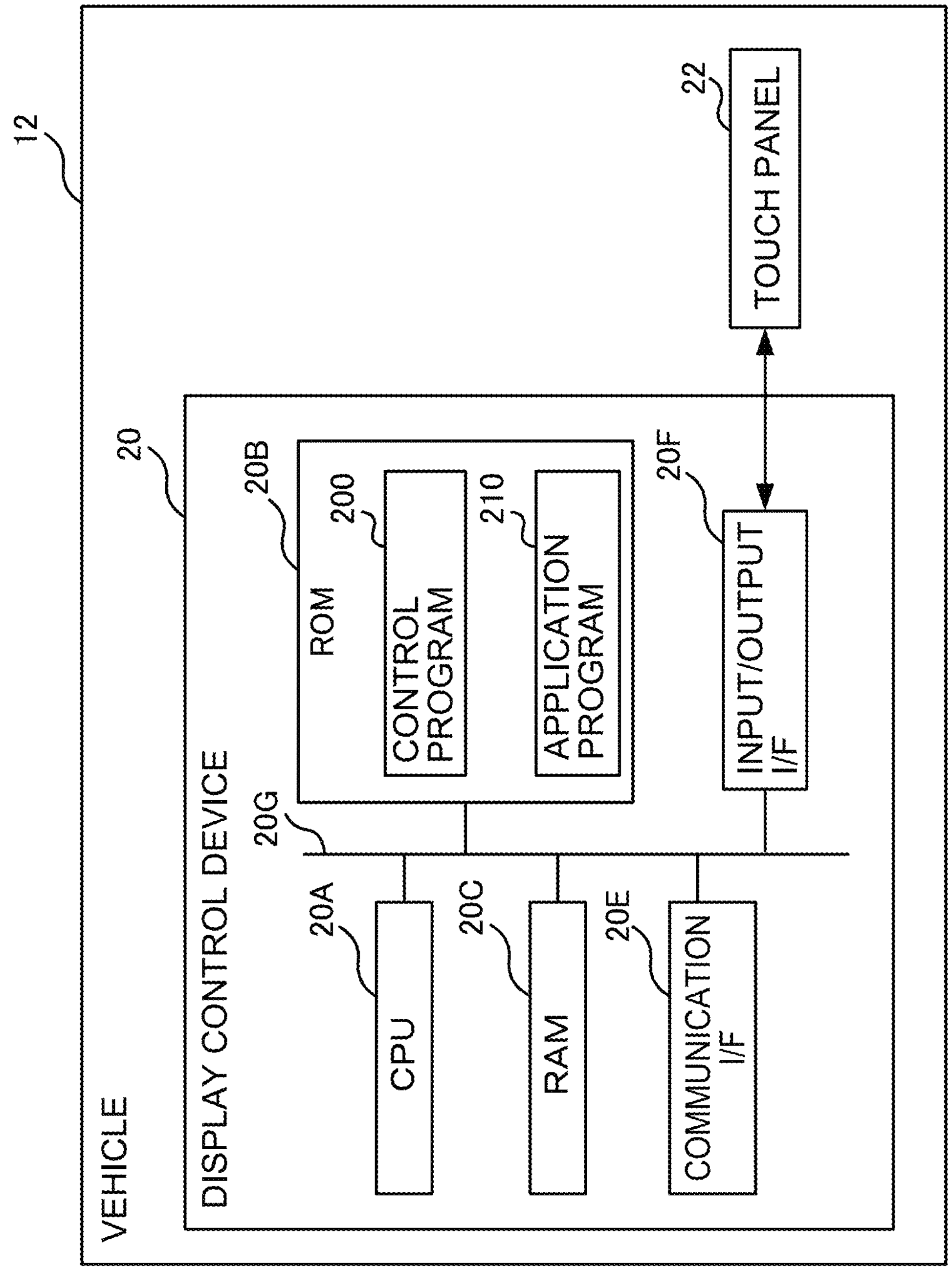
FIG. 1 is a block diagram illustrating a hardware configuration of a vehicle of an exemplary embodiment.

As illustrated in FIG. 1, a display control device 20 of an exemplary embodiment is a device installed in a vehicle 12. The vehicle 12 is configured including, as well as the display control device 20, at least a touch panel 22.

The display control device 20 is configured including a central processing unit (CPU) 20A, read only memory (ROM) 20B, random access memory (RAM) 20C, a communication interface (I/F) 20E, and an input/output interface (I/F) 20F. The CPU 20A, the ROM 20B, the RAM 20C, the communication IN 20E, and the input/output I/F 20F are connected together through a bus 20G so as to be capable of communicating with each other.

The CPU 20A is a central processing unit that executes various programs and controls various sections. Namely, the CPU 20A reads a program from the ROM 20B and executes the program using the RAM 20C as a workspace.

The ROM 20B is stored with various programs and various data. The ROM 20B of the present exemplary embodiment is stored with a control program 200 and plural application programs 210. The control program 200 is a program to perform various processing, which will be described later. Note that some or all of the application programs 210 may be stored on a secure digital (SD) card or universal serial bus (USB) memory connected to the display control device 20.

The RAM 20C serves as a workspace that temporarily stores programs and data.

The communication I/F 20E is an interface used for communication with an external server when executing an application performed with communication with the external server. The communication I/F 20E may employ a communication protocol such as 5G, LTE, Wi-Fi (registered trademark), or the like.

The input/output I/F 20F is an interface for communication with the touch panel 22 installed in the vehicle 12.

The touch panel 22 is, for example fixed to a dashboard of the vehicle 12. The touch panel 22 includes a liquid crystal display serving as a display section and a static capacitance sensor serving as an operation section. Note that the detection method of the touch panel 22 is not limited to static capacitance, and resistive film or optical detection may be employed. Alternatively, a liquid crystal display may be provided as the display section, and an operation section provided at a separate location to the liquid crystal display.

Figure 2:
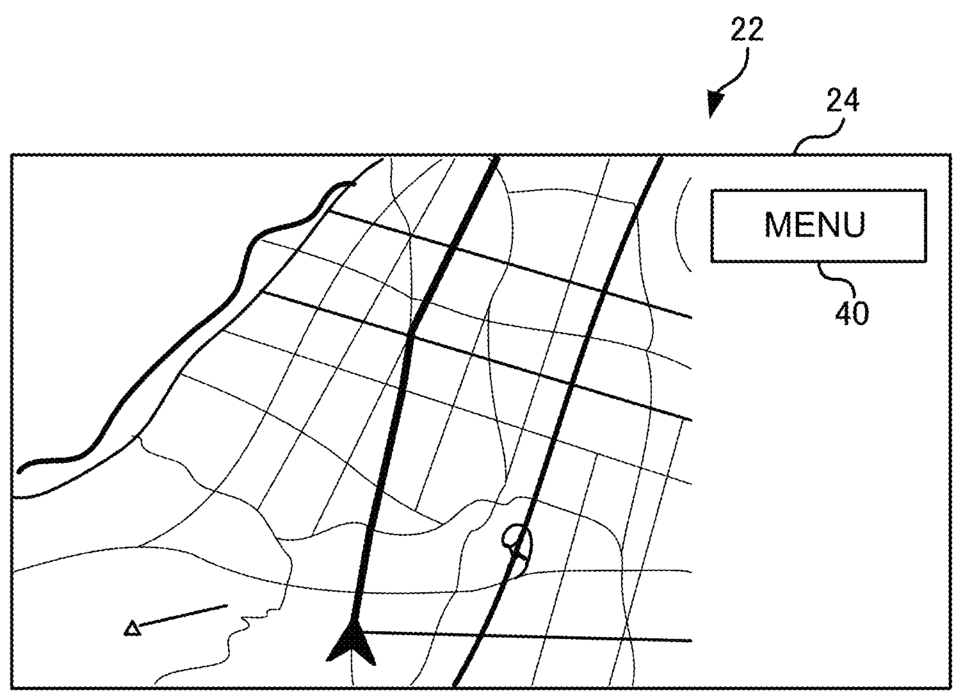
FIG. 2 is a diagram illustrating a default screen of a touch panel of an exemplary embodiment.
Figure 3:
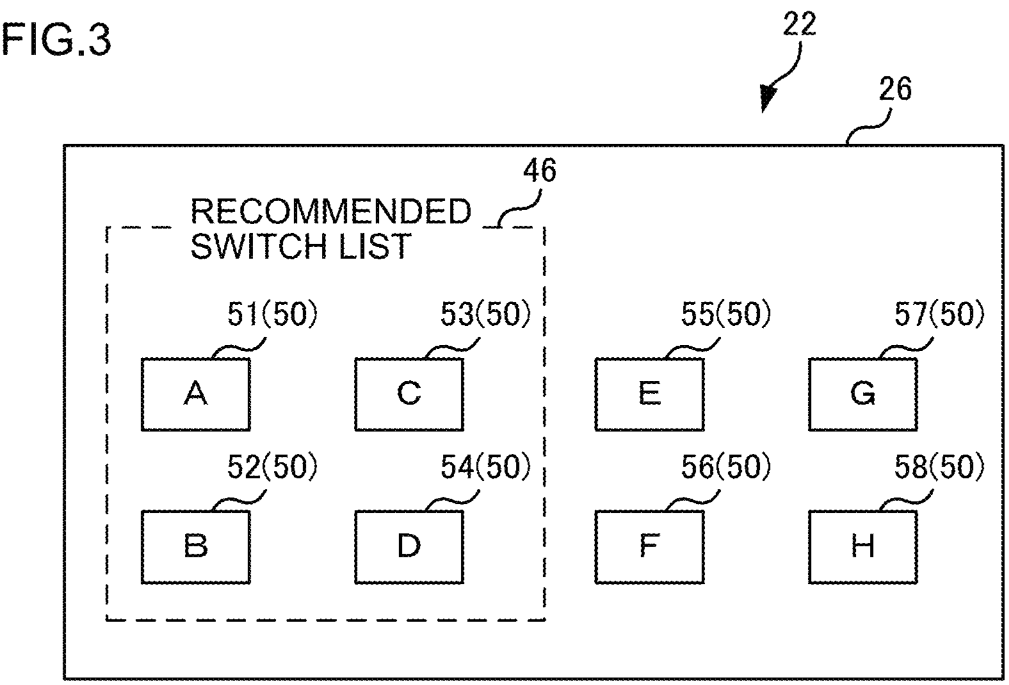
FIG. 3 is a diagram illustrating a menu screen of a touch panel of an exemplary embodiment.

The touch panel 22 of the present exemplary embodiment doubles as a monitor of a car navigation system. As illustrated in FIG. 2, a map is displayed on a default screen 24. A menu button 40 labeled with the word menu is also displayed on the default screen 24. The display on the touch panel 22 transitions to a menu screen 26, as illustrated in FIG. 3, when a user, namely an occupant of the vehicle 12, touches the menu button 40.

The menu screen 26 is a screen on which eight icons 50 are displayed. The icons 50 include an icon A51 and an icon B52 in a first column from the left of the screen, an icon C53 and an icon D54 in a second column, an icon E55 and an icon F56 in a third column, and an icon G57 and an icon H58 in a fourth column. Note that the icons 50 displayed on the menu screen 26 are not limited thereto, and a configuration may be adopted in which more icons 50 are displayable by the occupant performing a swiping operation on the touch panel 22. Although the respective icons 50 are labeled with the letters A to H in FIG. 3, in reality the icons 50 are displayed with images of symbols or graphics representing applications.

The menu screen 26 of the present exemplary embodiment is also provided with a designated region 46 toward the left side of the screen. The designated region 46 is bordered by a dashed line and includes the words "recommended switch list". The designated region 46 is an example of a prescribed region. The four icons 50 in the left two columns, namely the icon A51, the icon B52, the icon C53, and the icon D54 are provided in the designated region 46 as recommended switches that are recommended for execution by the occupant.

Figure 4:
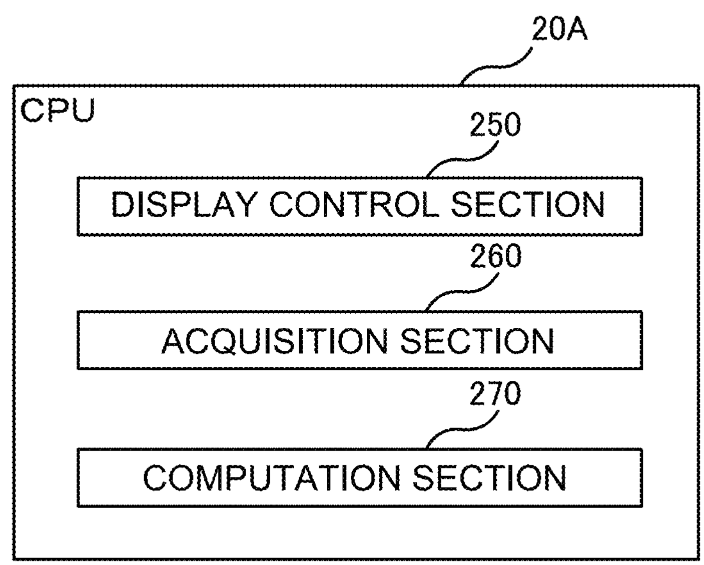
FIG. 4 is a block diagram illustrating an example of a functional configuration of a CPU of a display control device of an exemplary embodiment.

FIG. 4 is a block diagram illustrating an example of a functional configuration of the display control device 20. The configuration of each of these functions is implemented by the CPU 20A reading the control program 200 stored in the ROM 20B and executing the control program 200. The CPU 20A of the present exemplary embodiment functions as a display control section 250, an acquisition section 260, and a computation section 270 by executing the control program 200.

The display control section 250 arranges the icons 50 for starting up each of plural applications and displays the arrangement of the icons 50 on the touch panel 22. The display control section 250 also rearranges the icons 50 based on points computed by the computation section 270, described later, and displays the rearrangement of the icons 50 on the touch panel 22. More specifically, the display control section 250 rearranges the icons 50 having a high-ranking number of points in the designated region 46 of the touch panel 22, fixes the positions of icons 50 that are icons remaining in the designated region 46 when rearranging and displays these icons at these positions on the touch panel 22.

The acquisition section 260 acquires a number of times of use for each application. Each time a designated icon 50 on the menu screen 26 is operated to start up the corresponding application, the acquisition section 260 acquires the number of times of use for this application.

The computation section 270 computes points for each application based on a condition that includes the number of times of use as acquired by the acquisition section 260. In addition to the number of times of use of the application, the "condition" also includes factors such as whether or not the application is subject to history management, and whether or not the icon is an essential display icon. In the present exemplary embodiment, the icons 50 displayed on the touch panel 22 are managed using points, serving as a "priority level", that are allocated to each of the applications.

Processing Flow

Explanation follows regarding an example of a flow of processing executed by the display control device 20 of the present exemplary embodiment, with reference to a flowchart thereof.

Plural lists used to designate the respective icons 50 displayed on the touch panel 22 are prepared in the display control device 20 of the present exemplary embodiment. These lists include a switch (hereafter abbreviated to SW) list, a high-ranking list, and a recommendation list.

The SW list is a list including all of the icons 50. Each icon 50 included in the SW list is designated using a variable BP [n] (n=1 to the total number of SWs).

The high-ranking list is a list of icons 50 having a high-ranking number of points. Each icon 50 included in the high-ranking list is designated using a variable UB [n] (n=1 to the number of recommended SWs). Since the number of recommended SWs is four in the present exemplary embodiment, the high-ranking list includes the icons 50 having the first to fourth highest number of points.

The recommendation list is a list of the icons 50 for arranging in the designated region 46. Each icon 50 included in the recommendation list is designated using a variable CB [i] (i=1 to the number of recommended SWs). As mentioned above, the number of recommended SWs is four in the present exemplary embodiment, and so the recommendation list includes the four icons 50 that are arranged in the designated region 46.

The display control device 20 of the present exemplary embodiment controls images of the icons 50 displayed on the touch panel 22 based on the icons 50 included in each of the lists and on the points allocated to each icon 50.

SW Initialization Processing

First, explanation follows regarding "SW initialization processing" executed by the display control device 20. The SW initialization processing is executed when a battery of the vehicle 12 is replaced, or when reset processing is performed as desired.

Figure 5:
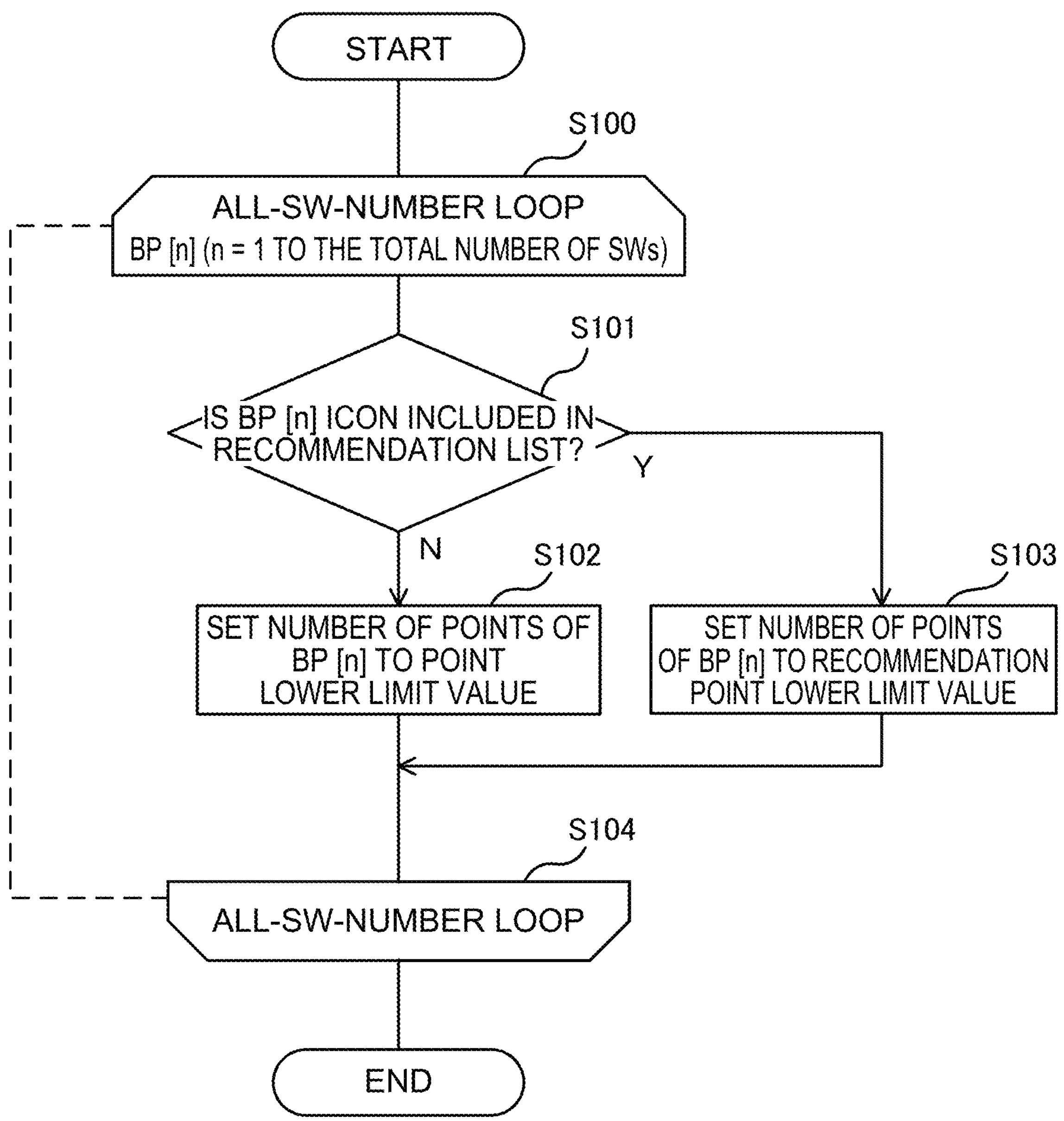
FIG. 5 is a flowchart illustrating a flow of SW initialization processing executed by a display control device of an exemplary embodiment.

Step S100 to step S104 of FIG. 5 are executed for BP [n], namely are executed in a processing loop "All-SW-Number Loop", repeatedly executed a number of times that is the total number of SWs.

At step S101, the CPU 20A determines whether or not the BP [n] icon 50 is included in the recommendation list. Processing proceeds to step S103 in cases in which the CPU 20A determines that the BP [n] icon 50 is included in the recommendation list. Processing proceeds to step S102 in cases in which the CPU 20A determines that the BP [n] icon 50 is not included in the recommendation list.

At step S102, the CPU 20A sets the number of points of the BP [n] to a point lower limit value. The point lower limit value is a predetermined value, and in the present exemplary embodiment the point lower limit value is "0".

At step S103, the CPU 20A sets the number of points of the BP [n] to a recommendation point lower limit value. The recommendation point lower limit value is a higher value than the point lower limit value, and in the present exemplary embodiment the recommendation point lower limit value is 1.5.

At step S104, the CPU 20A ends the SW initialization processing when the processing loop "All-SW-Number Loop" has been executed a number of times that is the total number of SWs.

Figure 6:
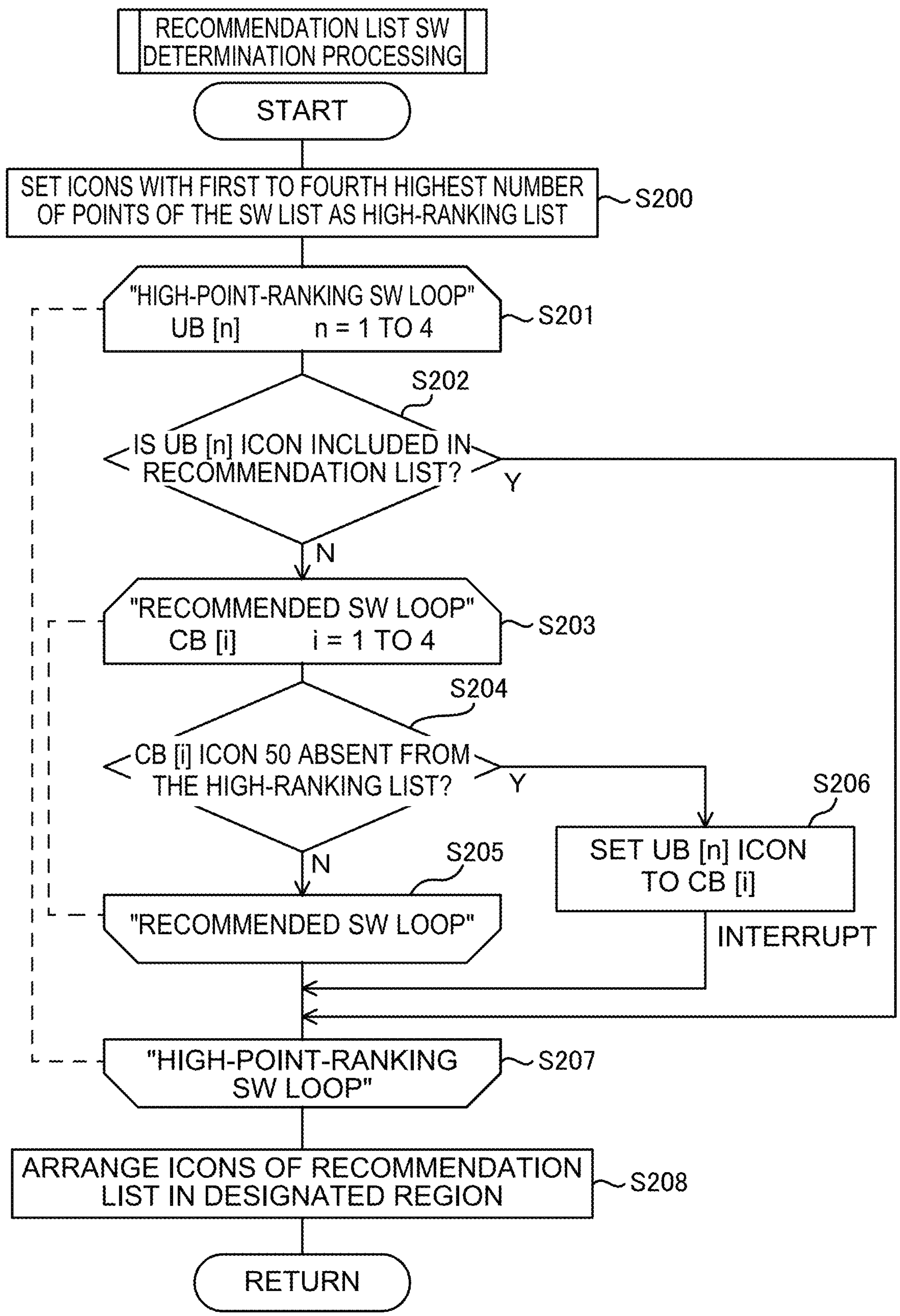
FIG. 6 is a flowchart illustrating a flow of recommendation list SW determination processing executed by a display control device of an exemplary embodiment.

Recommendation List SW Determination Processing: FIG. 6

Next, explanation follows regarding recommendation list SW determination processing executed when the menu button 40 on the touch panel 22 has been pressed. The recommendation list SW determination processing is processing to extract the icons 50 having the first to fourth highest ranking number of points, and to display these icons 50 on the menu screen 26 as recommended switches.

At step S200 in FIG. 6, the CPU 20A sets the icons 50 with the first to fourth highest number of points of the SW list as being included in the high-ranking list. Note that in cases in which there are icons 50 having the same number of points to the points of the first to fourth highest positions, the CPU 20A prioritizes icons 50 that are already recommended switches. Moreover, in cases in which icons 50 with the same number of points as each other are both already recommended switches, the CPU 20A determines the ranking of the icons 50 according to a priority ranking set separately for each application function.

Step S201 to step S207 are executed for UB [n], namely are executed in a processing loop "High-Point-Ranking SW Loop", repeatedly executed a number of times that is the number of recommended SWs, i.e. in this example four times.

At step S202, the CPU 20A determines whether or not the UB [n] icon 50 is included in the recommendation list. Processing proceeds to step S207 in cases in which the CPU 20A determines that the UB [n] icon 50 is included in the recommendation list, and processing proceeds to step S203 in cases in which the CPU 20A determines that the UB [n] icon 50 is not included in the recommendation list.

Step S203 to step S205 are executed for CB [i], namely are executed in a processing loop "Recommended SW Loop", repeatedly executed a number of times that is the number of recommended SWs, i.e. in this example four times.

At step S204, the CPU 20A determines whether or not the CB [i] icon 50 is absent from the high-ranking list. Processing proceeds to step S206 in cases in which the CPU 20A determines that the CB [i] icon 50 is absent from the high-ranking list, and processing proceeds to step S205 in cases in which the CPU 20A determines that the CB [i] icon 50 is included in the high-ranking list.

At step S205, the CPU 20A proceeds to processing of step S207 when the processing loop of the "Recommended SW Loop" has been executed four times.

At step S206, the CPU 20A sets the UB [n] icon 50 to CB [i]. The CPU 20A then interrupts the "Recommended SW Loop" and proceeds to the processing of step S207.

At step S207, the CPU 20A proceeds to the processing of step S208 when the processing loop of the "High-Point-Ranking SW Loop" has been executed four times.

At step S208, the CPU 20A arranges the icons 50 of the recommendation list in the designated region 46. Note that the other icons 50 are arranged in another region of the menu screen 26 outside the designated region 46. The icons 50 arranged in the other region may be arranged icons 50 with a high ranking number of points, or may be icons 50 predetermined for each application function. The CPU 20A then ends the recommendation list SW determination processing.

Figure 7:
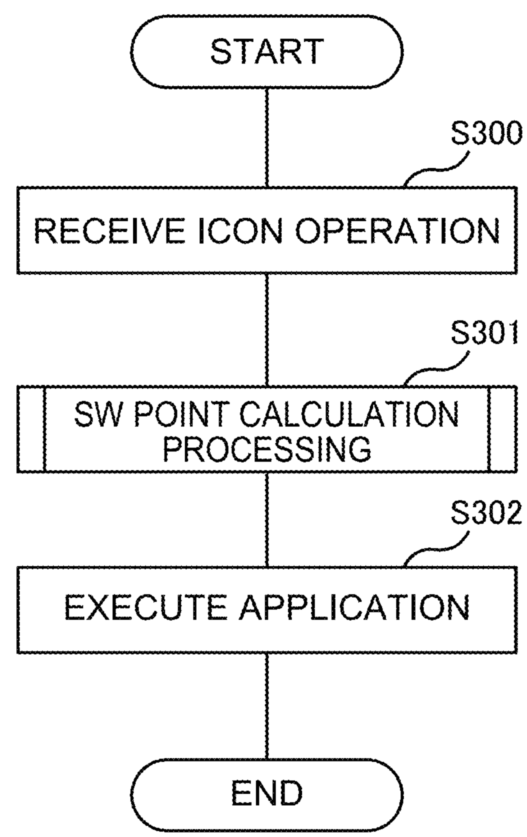
FIG. 7 is a flowchart illustrating a flow of application execution processing executed by a display control device of an exemplary embodiment.

Application Execution Processing: FIG. 7

Next, explanation follows regarding application execution processing executed when one of the icons 50 on the touch panel 22 has been pressed.

At step S300 in FIG. 7, the CPU 20A receives operation of the icon 50 by the occupant.

At step S301, the CPU 20A executes SW point calculation processing, described later.

At step S302, the CPU 20A executes the application corresponding to the operated icon 50. The CPU 20A then ends the application execution processing.

Figure 8:
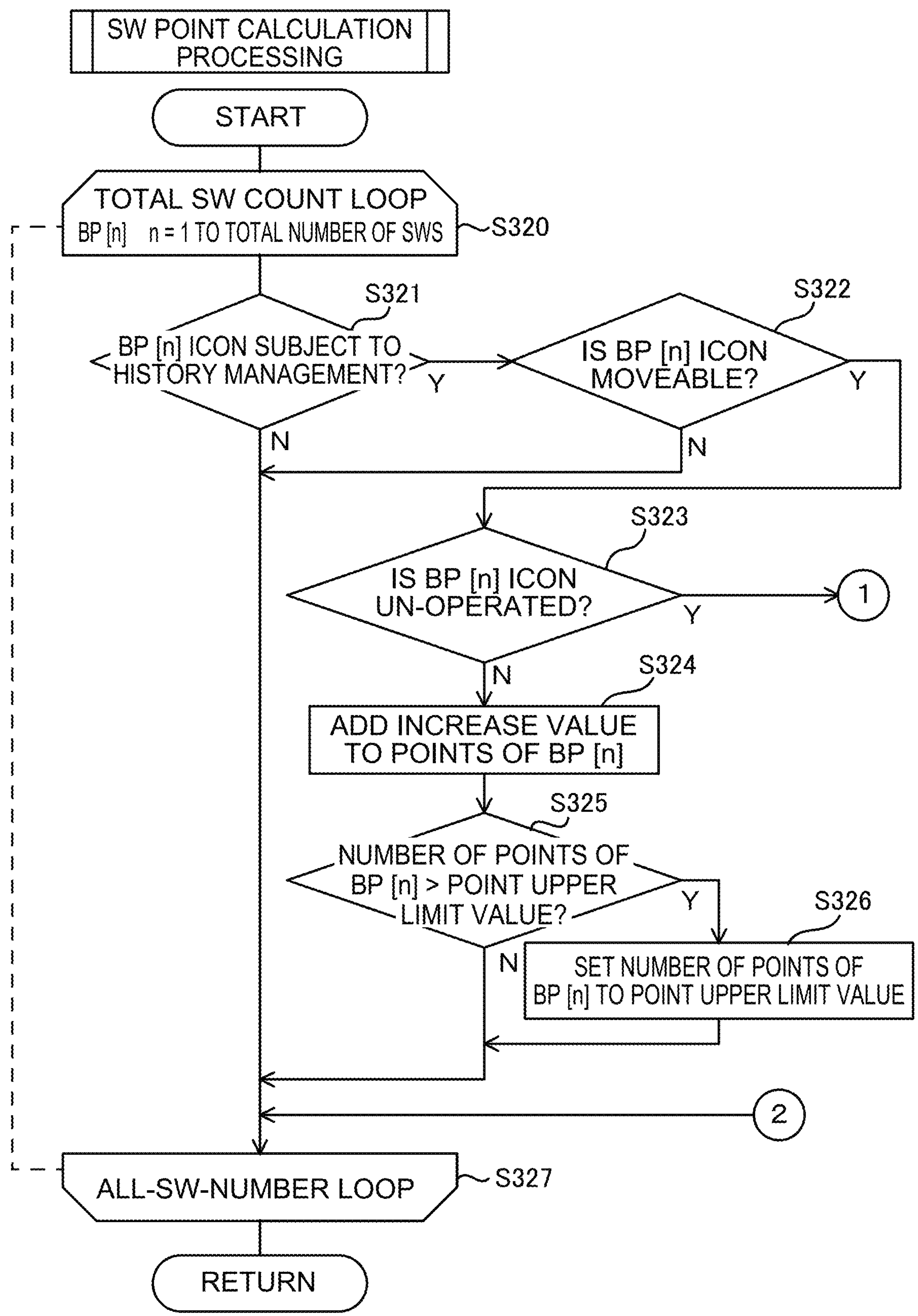
FIG. 8 is a flowchart illustrating a flow of SW point calculation processing executed by a display control device of an exemplary embodiment.

SW Point Calculation Processing: FIG. 8

Next, explanation follows regarding the SW point calculation processing of step S301. The SW point calculation processing is processing to increase the points of icons 50 for applications that have been executed up to an upper limit value, and to reduce the points of icons 50 for applications not executed down to a lower limit value.

Step S320 to step S327 of FIG. 8 are executed for BP [n], namely are executed in a processing loop "All-SW-Number Loop", repeatedly executed a number of times that is the total number of SWs.

At step S321, the CPU 20A determines whether or not the BP [n] icon 50 is subject to history management. Processing proceeds to step S322 in cases in which the CPU 20A determines the BP [n] icon 50 to be subject to history management, and processing proceeds to step S327 in cases in which the CPU 20A determines the BP [n] icon 50 not subject to history management.

In the present exemplary embodiment, certain applications are deemed not subject to history management, such as applications for performing system settings or emergency calls, and the number of times of use is not computed therefor by the computation section 270. Accordingly, the processing of step S321 results in point calculations not being executed for icons 50 of applications not subject to history management.

At step S322, the CPU 20A determines whether or not the BP [n] icon 50 is moveable. Processing proceeds to step S323 in cases in which the CPU 20A determines the BP [n] icon 50 to be moveable, and processing proceeds to step S327 in cases in which the CPU 20A determines that the BP [n] icon 50 is fixed. The processing of step S322 results in points not being decreased for fixed icons 50 even when the corresponding application has not been used.

At step S323, the CPU 20A determines whether or not the BP [n] icon 50 is un-operated. Processing proceeds to step S328 of FIG. 9 via reference 1 in cases in which the CPU 20A determines that the BP [n] icon 50 is un-operated, and processing proceeds to step S324 in cases in which the CPU 20A determines that the BP [n] icon 50 has been operated.

At step S324, the CPU 20A adds an increase value to the points of the BP [n]. The increase value is a predetermined value, and in the present exemplary embodiment, the increase value in the number of points is "1.0".

At step S325, the CPU 20A determines whether or not the number of points of the BP [n] is greater than a point upper limit value. Processing proceeds to step S326 in cases in which the CPU 20A determines that the number of points of the BP [n] is greater than the point upper limit value, and processing proceeds to step S327 in cases in which the CPU 20A determines that the number of points of the BP [n] is not greater than the point upper limit value, namely is the point upper limit value or lower.

At step S326, the CPU 20A sets the number of points of the BP [n] to the point upper limit value. The point upper limit value is a predetermined value, and in the present exemplary embodiment the point upper limit value is "3.0".

At step S327, the CPU 20A ends the SW point calculation processing and returns to the original processing when the processing loop of the "All-SW-Number Loop" has been finished a number of times that is the total number of SWs.

Figure 9:
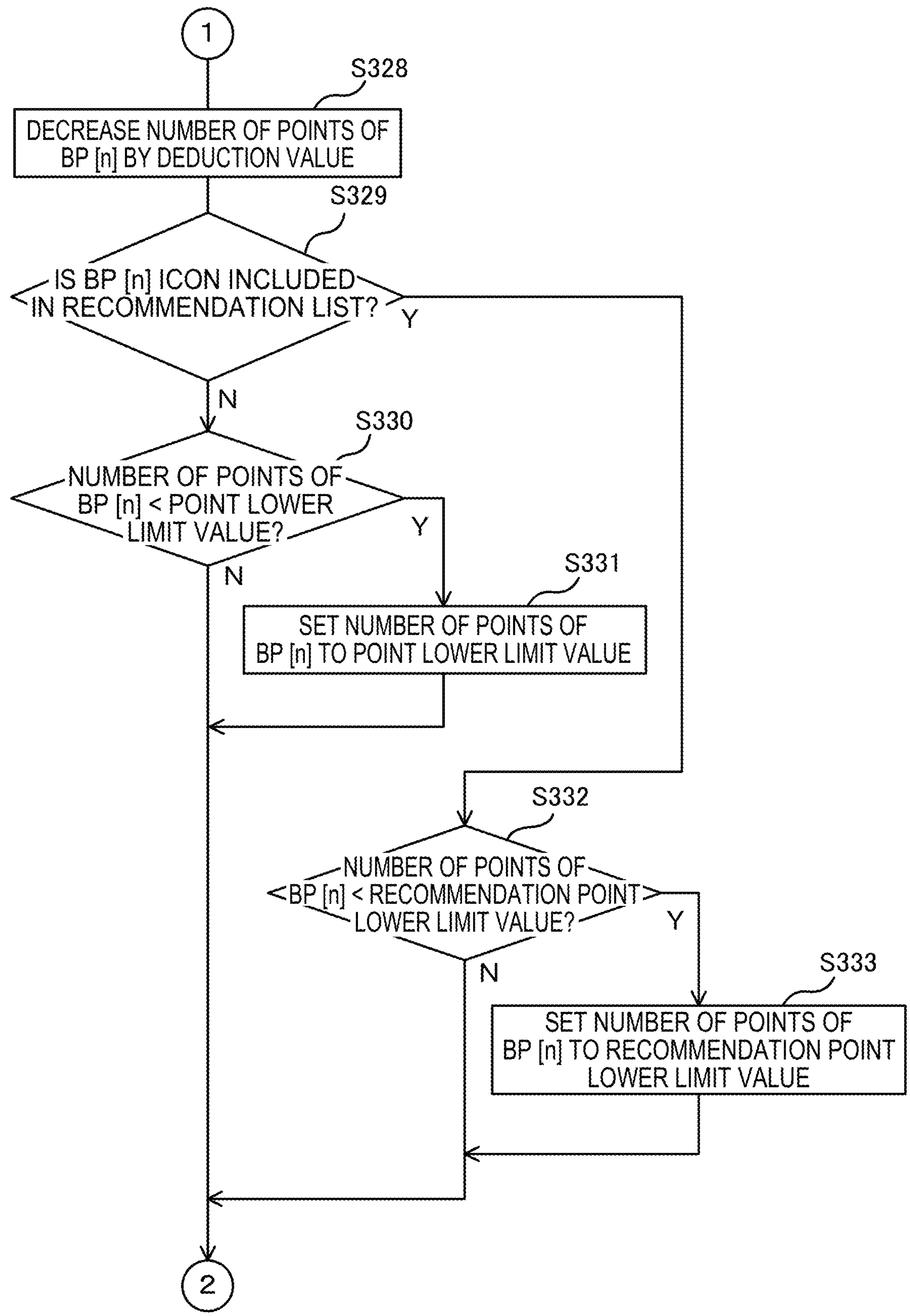
FIG. 9 is a flowchart illustrating a flow of SW point calculation processing executed by a display control device of an exemplary embodiment (in continuation of FIG. 8)

At step S328 in FIG. 9, the CPU 20A decreases the number of points of the BP [n] by a deduction value. The deduction value is a predetermined value, and in the present exemplary embodiment the deduction value in the number of points is "0.1".

At step S329, the CPU 20A determines whether or not the BP [n] icon 50 is included in the recommendation list. Processing proceeds to step S332 in cases in which the CPU 20A determines the BP [n] icon 50 to be included in the recommendation list, and processing proceeds to step S330 in cases in which the CPU 20A determines the BP [n] icon 50 not to be included in the recommendation list.

At step S330, the CPU 20A determines whether or not the number of points of the BP [n] is lower than the point lower limit value. Processing proceeds to step S331 in cases in which the CPU 20A determines that the number of points of the BP [n] is lower than the point lower limit value, and processing proceeds to step S327 of FIG. 8 via reference 2 in cases in which the CPU 20A determines that the number of points of the BP [n] is not lower than the point lower limit value, namely that the number of points of the BP [n] is the point lower limit value or higher.

At step S331, the CPU 20A sets the number of points of the BP [n] to the point lower limit value, and then processing proceeds to step S327 of FIG. 8 via reference 2.

At step S332, the CPU 20A determines whether or not the number of points of the BP [n] is lower than the recommendation point lower limit value. Processing proceeds to step S333 in cases in which the CPU 20A determines that the number of points of the BP [n] is lower than the recommendation point lower limit value, and processing proceeds to step S327 of FIG. 8 via reference 2 in cases in which the CPU 20A determines that the number of points of the BP [n] is not lower than the recommendation point lower limit value, namely the number of points of the BP [n] is the recommendation point lower limit value or higher.

At step S333, the CPU 20A sets the number of points of the BP [n] to the recommendation point lower limit value, and then processing proceeds to step S327 in FIG. 8 via reference 2.

As described above, at step S327 the CPU 20A ends the SW point calculation processing when the processing loop of the "All-SW-Number Loop" has been finished a number of times that is the total number of SWs.

Figure 10:
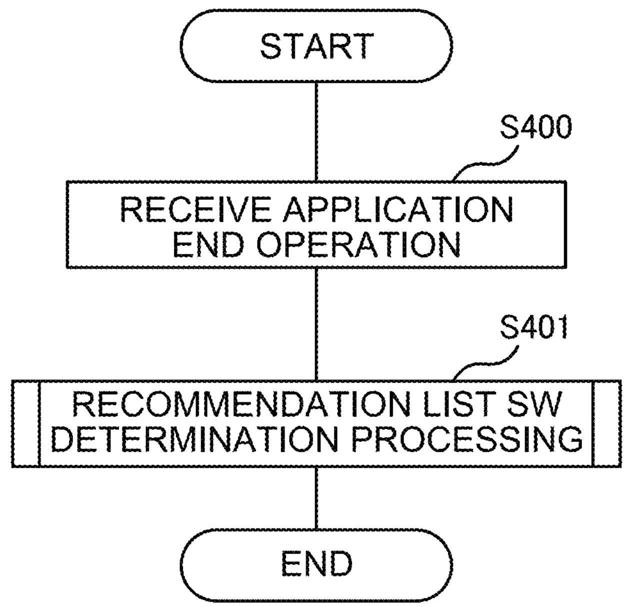
FIG. 10 is a flowchart illustrating a flow of display rearrangement processing executed by a display control device of an exemplary embodiment.

Display Rearrangement Processing: FIG. 10

Next, explanation follows regarding display rearrangement processing that is executed when an application has ended.

At step S400 in FIG. 10, the CPU 20A receives an application end operation by the occupant. The end operation means, for example, that an end button in the application has been operated by an occupant.

At step S401, the CPU 20A executes the recommendation list SW determination processing described above. The CPU 20A then ends the display rearrangement processing.

Figure 11:
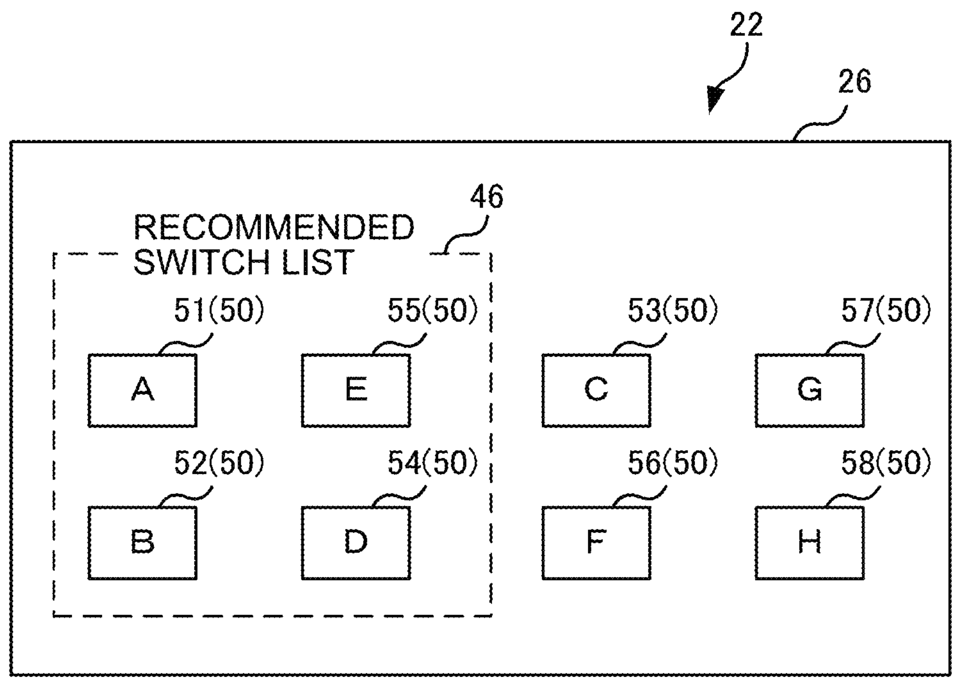
FIG. 11 is a diagram illustrating a menu screen in which icons have been rearranged on a touch panel of an exemplary embodiment.

Accompanying execution of the display rearrangement processing, the CPU 20A rearranges the display on the menu screen 26. When this is performed, the CPU 20A arranges each icon 50 on the screen based on the points calculated in the SW point calculation processing. For example, regarding the icon E55 in the menu screen 26 illustrated in FIG. 3 and in the menu screen 26 when subsequently displayed, the number of points of the icon E55 enters fourth highest in the ranking as a result of the icon E55 being operated plural times, with the number of points of the icon C53 no longer being placed fourth in the ranking. In this case, as illustrated in FIG. 11, the icon E55 is placed in the designated region 46 instead of the icon C53. Namely, on the touch panel 22 the icon E55 that has a high usage frequency is displayed in the recommended switch list. Moreover, in the present exemplary embodiment, for the icons 50 that are icons remaining in the designated region 46, control is performed such that their display positions do not change. Accordingly, the display positions in the designated region 46 of the icon A51, the icon B52, and the icon D54 are unchanged before and after the display rearrangement.

Figure 12:
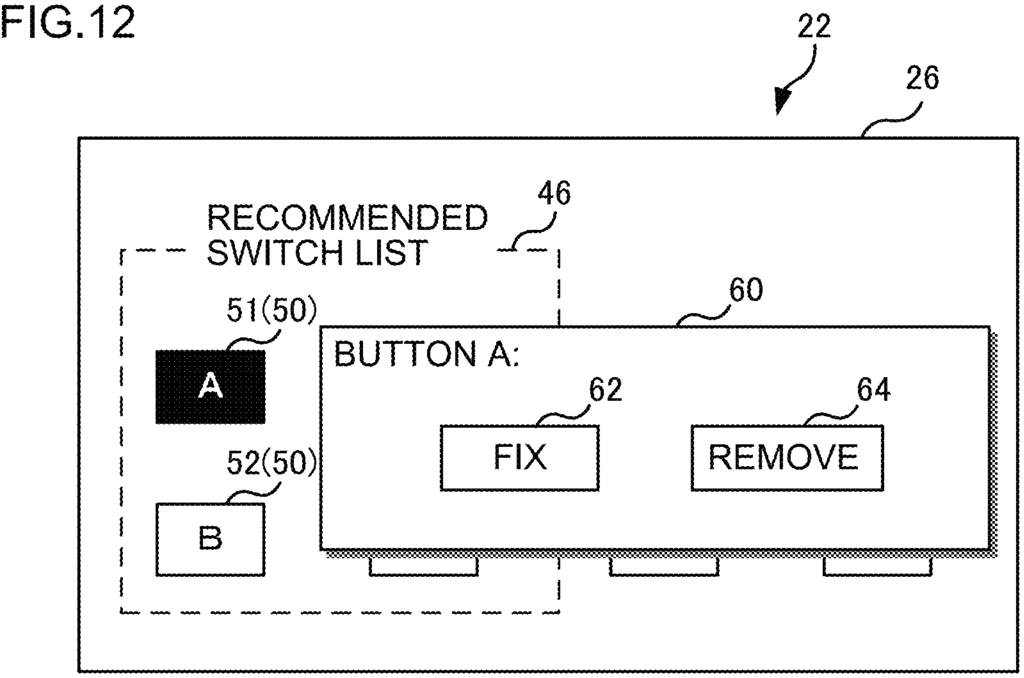
FIG. 12 is a diagram illustrating a sub-menu screen of a touch panel of an exemplary embodiment.

Note that if the occupant holds down one of the icons 50 on the menu screen 26, as illustrated in FIG. 12 a sub-menu screen 60 is displayed overlaid on the menu screen 26. The sub-menu screen 60 is an operation screen used to select whether to fix the held-down icon 50 in the designated region 46 or to remove the held-down icon 50 from the designated region 46. For example, the sub-menu screen 60 is displayed when the occupant holds down the icon A51 so as to allow selection of whether to fix or remove the icon A51. The sub-menu screen 60 includes a fix button 62 labeled with the word "fix", and a remove button 64 labeled with the word "remove".

SW Fixing Processing

The sub-menu screen 60 disappears when the occupant operates the fix button 62 on the sub-menu screen 60. Thereafter, the icon A51 will not be removed from the designated region 46 or moved to another region, even if the number of times the application corresponding to the icon A51 is used decreases or the number of times another application is used increases. SW fixing processing is executed in cases in which the fix button 62 is operated. Explanation follows regarding the SW fixing processing.

Figure 13:
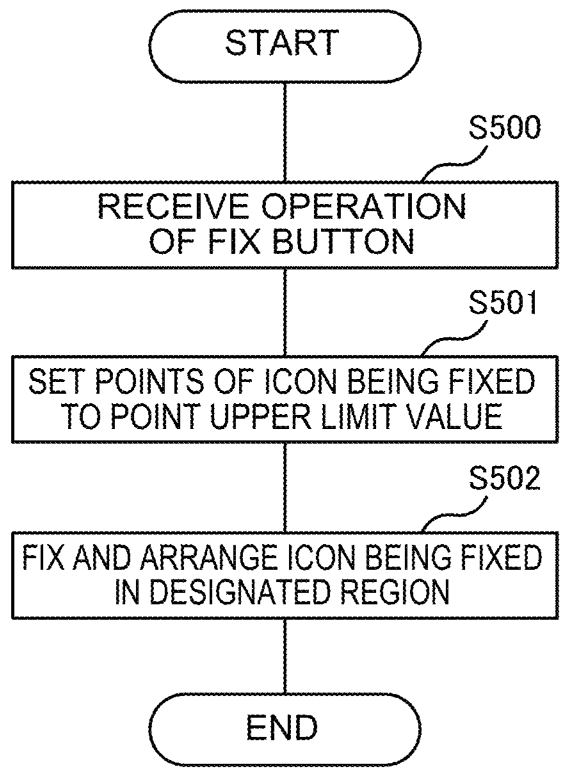
FIG. 13 is a flowchart illustrating a flow of SW fixing processing executed by a display control device of an exemplary embodiment.

At step S500 in FIG. 13, the CPU 20A receives operation of the fix button 62.

At step S501, the CPU 20A sets the point upper limit value as the number of points of the icon 50 being fixed.

At step S502, the CPU 20A arranges the icon 50 being fixed so as to be arranged fixed in the designated region 46. The CPU 20A then ends the SW fixing processing.

SW Removal Processing

Meanwhile, the sub-menu screen 60 of FIG. 12 also disappears when the occupant operates the remove button 64 of the sub-menu screen 60. The icon A51 is then removed from the designated region 46 of the menu screen 26. SW removal processing is executed in cases in which the remove button 64 is operated. Explanation follows regarding the SW removal processing.

Figure 14:
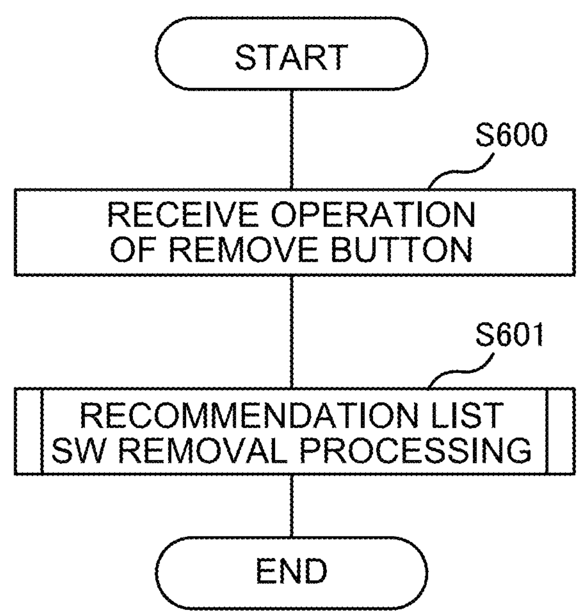
FIG. 14 is a flowchart illustrating a flow of SW removal processing executed by a display control device of an exemplary embodiment.

At step S600 in FIG. 14, the CPU 20A receives operation of the remove button 64.

At step S601, the CPU 20A executes recommendation list SW removal processing. The CPU 20A then ends the SW removal processing.

Figure 15:
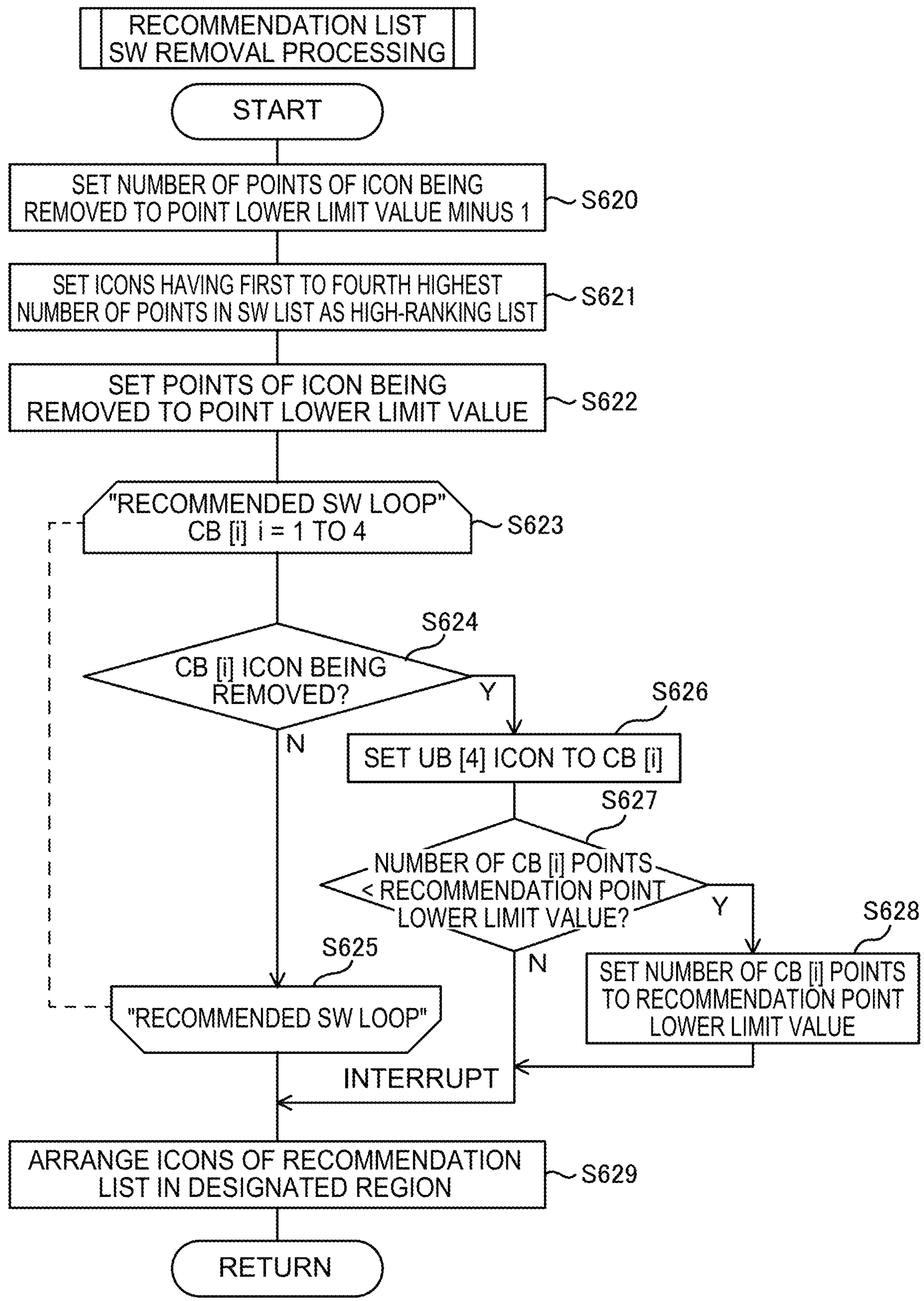
FIG. 15 is a flowchart illustrating a flow of recommendation list SW removal processing executed by a display control device of an exemplary embodiment.

Recommendation list SW Removal Processing: FIG. 15

Next, explanation follows regarding the recommendation list SW removal processing of step S601.

At step S620 in FIG. 15, the CPU 20A sets the number of points of the icon 50 being removed to the point lower limit value minus one. Namely, in the present exemplary embodiment, the number of points of the icons 50 being removed is set to "4". Step S620 is processing to forcibly make the number of points of the icon 50 being removed the lowermost ranking.

At step S621, the CPU 20A sets the icons 50 having the first to fourth highest number of points in the SW list as being included in the high-ranking list. Note that the method to determine the point ranking is similar to that of step S200.

At step S622, the CPU 20A sets the point lower limit value for the number of points of the icon 50 being removed.

Step S623 to step S625 are executed for CB [i] by a processing loop "Recommended SW Loop" repeated for a number of times that is the number of recommended switches, namely repeated four times in this example.

At step S624, the CPU 20A determines whether or not the CB [i] icon 50 is being removed. In cases in which the CPU 20A determines that the CB [i] icon 50 is being removed, processing proceeds to step S626, and in cases in which the CPU 20A determines that the CB [i] icon 50 is not being removed, processing proceeds to step S625.

At step S625, when four the processing loop of the "Recommended SW Loop" has been executed four times, the CPU 20A proceeds to the processing of step S629.

At step S626, the CPU 20A sets the UB [4] icon 50 to CB [i]. Namely, the icon 50 with the lowermost point ranking among the high-ranking list is set in the recommendation list.

At step S627, the CPU 20A determines whether or not the CB [i] has fewer points than the recommendation point lower limit value. In cases in which the CPU 20A determines that the CB [i] has fewer points than the recommendation point lower limit value, processing proceeds to step S628, and in cases in which the CPU 20A determines that the CB [i] does not have fewer points than the recommendation point lower limit value, namely has the recommendation point lower limit value or greater, the "Recommended SW Loop" is interrupted and processing proceeds to step S629.

At step S628, the CPU 20A sets the number of points of the CB [i] to the recommendation point lower limit value. The CPU 20A then interrupts the "Recommended SW Loop" and proceeds to the processing of step S629.

At step S629, the CPU 20A arranges the icons 50 of the recommendation list in the designated region 46. The icon 50 being removed is thus removed from the designated region 46. The CPU 20A then ends the recommendation list SW removal processing and returns to the original processing.

Figure 16:
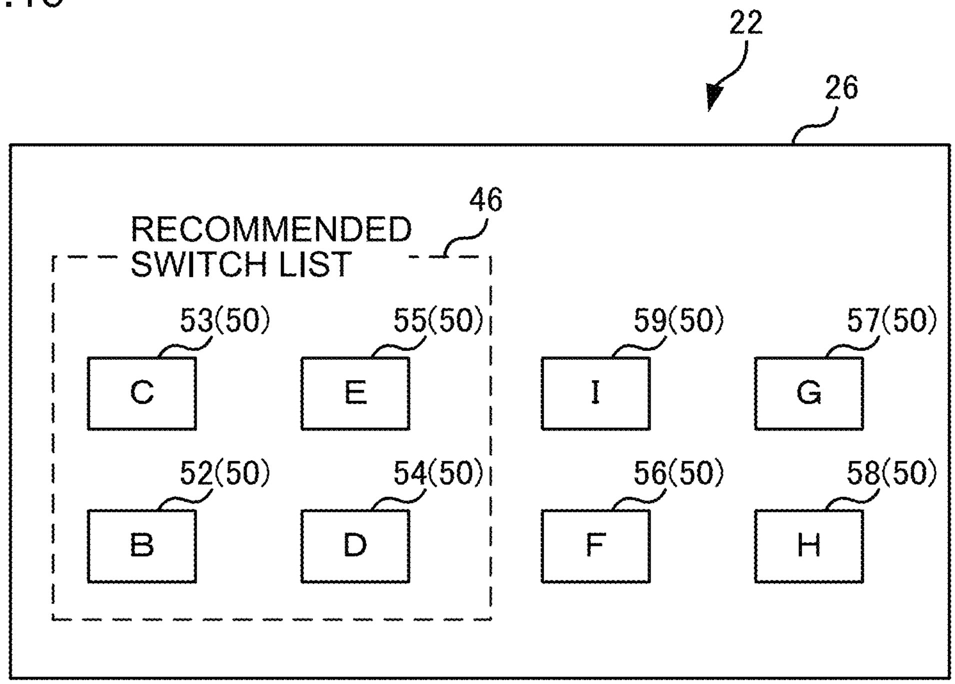
FIG. 16 is a diagram illustrating a menu screen on a touch panel of an exemplary embodiment from which a designated icon has been removed.

As a result of executing the SW removal processing, for example in cases in which the icon A51 has been removed, the icon C53 is arranged in the designated region 46 instead of the icon A51, as illustrated in FIG. 16. In the present exemplary embodiment, the display positions are controlled so as not to change for the icons 50 that are icons remaining in the designated region 46. Accordingly, for the icon B52, the icon D54, and the icon E55, the positions thereof in the designated region 46 do not change before and after removal of the icon A51. Note that as a result of removing the icon A51, a new icon 159 is displayed in the space where the icon E55 had been displayed.

Figure 17:
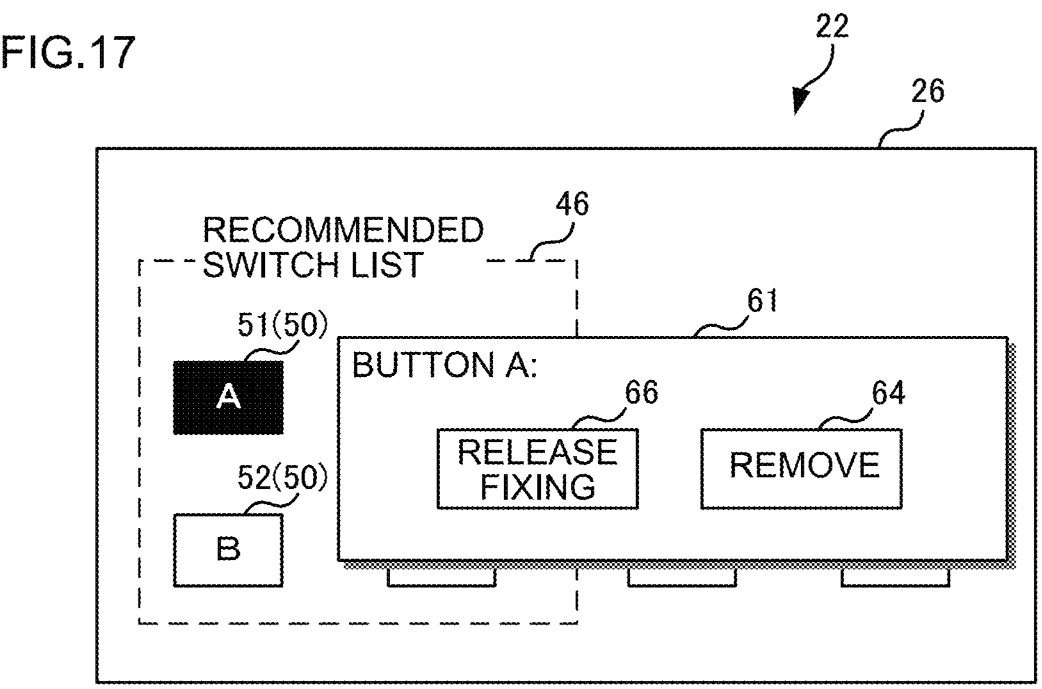
FIG. 17 is a diagram illustrating another sub-menu screen of a touch panel of an exemplary embodiment.

Note that in cases in which the icon A51 is fixed as illustrated in FIG. 12, a method to release such fixing is as follows. Namely, a sub-menu screen 61, as illustrated in FIG. 17, is displayed when the occupant holds down the icon A51 on the menu screen 26 so as to allow selection of whether to release fixing of the icon A51 or to remove the icon A51. The sub-menu screen 61 includes a fixing release button 66 labeled with the words "release fixing", and the remove button 64.

The sub-menu screen 61 disappears when the occupant operates the fixing release button 66 on the sub-menu screen 61. Fixing of the icon A51 to the designated region 46 is then released. The icon A51 is thus allowed to move from the designated region 46 to another region depending on the usage frequency of the applications corresponding to the icons 50. Explanation follows regarding SW fixing release processing executed in cases in which the fixing release button 66 is operated.

Figure 18:
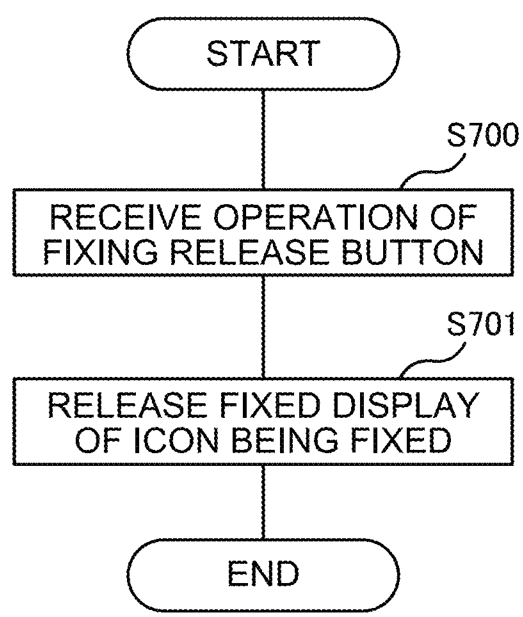
FIG. 18 is a flowchart illustrating a flow of SW fixing release processing executed by a display control device of an exemplary embodiment.

At step S700 in FIG. 18, the CPU 20A receives operation of the fixing release button 66.

At step S701, the CPU 20A releases the fixed display of the icon 50 being fixed. The CPU 20A then ends the SW fixing release processing.

SUMMARY

The display control device 20 of the present exemplary embodiment is applied in cases to arrange the icons 50 used to start up plural respective applications on the touch panel 22. In the present exemplary embodiment, the computation section 270 computes points for each application, in other words points for each icon 50, based on a condition including the number of times of use of each application as acquired by the acquisition section 260.

In the display control device 20, the display control section 250 arranges the icons 50 having the first to fourth highest ranking numbers of points in the designated region 46 of the menu screen 26. Each time display of the menu screen 26 is rearranged, the display control section 250 rearranges the respective icons 50 with the first to fourth highest ranking numbers of points at that moment in the designated region 46. During this rearrangement, the display positions are fixed for the icons 50 that are icons remaining in the designated region 46. Although there might be cases in which the positions are changed of the icons 50 in the recommended switch list on the menu screen 26 with each operation, making operation difficult for the occupant when driving, the display control device 20 according to the present exemplary embodiment is capable of suppressing any changes in the arrangement on the menu screen 26 that accompany changes in the number of points.

In the display control device 20 of the present exemplary embodiment, based on operation of the fix button 62 in the sub-menu screen 60 displayed when a given icon 50 is held down, this icon 50 is able to be fixed in the designated region 46. Although a drop in the usage frequency of an icon 50 in the recommended switch list might result in this icon 50 being removed accompanying this drop in usage frequency irrespective of the wishes of the occupant, the present exemplary embodiment is capable of displaying an icon 50 in the designated region 46 at all the times in cases in which the occupant desires this icon 50 to be displayed on the menu screen 26 even at a low usage frequency. This enables implementation of an icon 50 display mode tailored to the preferences of the occupant.

Note that in the present exemplary embodiment, the increase value in the number of points when one of the icons 50 is operated is set at 1.0, whereas the deduction value in the number of points when the icon 50 is not operated is set to 0.1. Moreover, the point lower limit value of a given icon 50 in the recommendation list is set to 1.5, whereas the point lower limit value of icons 50 not in the recommendation list is set to 0.0. Accordingly, since the size of a deduction in points from an icon 50 displayed in the designated region 46 at each occasion is small, and the point lower limit value for such icons 50 is also set higher than for the icons 50 not in the recommendation list, such icons are suppressed from being moved out of the designated region 46 immediately even when there is a drop in the usage frequency of such icons 50.

Moreover, in the display control device 20 of the present exemplary embodiment, a given icon 50 can be removed from the designated region 46 by operating the remove button 64 in the sub-menu screen 60 displayed when the icon 50 is held down. Although there might be cases in which a given icon 50 in the recommended switch list does not suit the needs or intentions of the occupant, the present exemplary embodiment enables the display of icons 50 that the occupant does not wish to be displayed on the menu screen 26 to be prevented from being displayed in the designated region 46 even if the usage frequency of such icons 50 is high. This enables implementation of a display mode of the icons 50 tailored to the preferences of the occupant.

Remarks

The various processing executed by the CPU 20A reading software (programs) in the exemplary embodiments described above may be executed by various types of processor other than a CPU. Examples of such processors include programmable logic devices (PLD) that allow circuit configuration to be modified post-manufacture, such as field-programmable gate arrays (FPGAs), and dedicated electrical circuits, these being processors including a circuit configuration custom-designed to execute specific processing, such as an application specific integrated circuit (ASIC). The reception processing described above may be executed by any one of these various types of processor, or by a combination of two or more of the same type or different types of processor (such as plural FPGAs, or a combination of a CPU and an FPGA). The hardware structure of these various types of processors is more specifically an electrical circuit combining circuit elements such as semiconductor devices.

In the exemplary embodiment described above, explanation has been given regarding an example in which respective programs are stored in advance (installed) on a computer readable non-transitory recording medium. For example, the control program 200 of the display control device 20 is stored in advance in the ROM 20B. However, there is no limitation thereto, and the respective programs may be provided in a format recorded on a non-transitory recording medium such as compact disc read only memory (CD-ROM), digital versatile disc read only memory (DVD-ROM), or universal serial bus (USB) memory. Alternatively, the programs may be downloaded from an external device over a network.

The processing flows described in the above exemplary embodiment are merely examples thereof, and unnecessary steps may be removed, new steps may be added, or the processing sequence may be rearranged within a range not departing from the spirit thereof

The invention claimed is:

1. A display control device comprising:

a display control section configured to arrange, on a display, icons for starting each of a plurality of applications, wherein the display includes a designated region in which the icons are able to be arranged;

an acquisition section configured to acquire a number of times of use for each of the applications; and a computation section configured to compute a priority level for each of the applications based on a condition including the number of times of use as acquired by the acquisition section, the display control section being configured to:

effect a rearrangement, in the display, position, during the rearrangement, each icon associated with a high-priority application of the plurality of applications in the designated region, wherein a priority level of each of the plurality of applications is computed by the computation section, maintain a location of any of the icons in the designated region prior to the rearrangement within the designated area during the rearrangement regardless of the priority level of the application of the plurality of applications associated with the any of the icons, in response to receiving a prescribed operation from a user on an icon of the icons, perform control so as to fix the icon subjected to the prescribed operation so as to be fixed in the designated region irrespective of a priority level of an application of the plurality of applications associated the icon, and in response to a first icon of the plurality of the icons being held down arrange, on the display, a sub-menu including options for changing a fix status of the first icon.

2. The display control device of claim 1, wherein the prescribed operation is an operation of holding down the icon in order to display an operation screen used to select whether to fix the held-down icon in the designated region or to remove the held-down icon from the designated region and, on the operation screen, selecting whether to fix or remove the held-down icon.

3. The display control device of claim 1, wherein:

the plurality of applications includes at least one application not subject to history management, the at least one application includes an application for performing system settings or emergency calls, and the computation section is configured not to compute the priority level for each of the at least one application.

4. The display control device of claim 1, wherein the display control section is configured to:

generate the sub-menu including an option to fix a location of the first icon during the rearrangement in response to the fix status of the first icon being unfixed.

5. The display control device of claim 4, wherein the display control section is configured to:

fix the location of the first icon during the rearrangement in response to a fix option being selected from the sub-menu.

6. The display control device of claim 4, wherein the display control section is configured to:

generate the sub-menu including an option to unfix the location of the first icon during the rearrangement in response to the fix status of the first icon being fixed.

7. The display control device of claim 6, wherein the display control section is configured to:

unfix the location of the first icon during the rearrangement in response to an unfix option being selected from the sub-menu.

8. The display control device of claim 4, wherein the display control section is configured to:

generate the sub-menu including an option to remove the first icon from the designated region prior to the rearrangement.

9. The display control device of claim 8, wherein the display control section is configured to:

remove the first icon from the designated region prior to the rearrangement in response to a remove option being selected from the sub-menu.

10. The display control method of claim 9, wherein the controlling step further comprises:

generating the sub-menu including an option to remove the first icon from the designated region prior to the rearrangement.

11. The display control method of claim 10, wherein the controlling step further comprises:

removing the first icon from the designated region prior to the rearrangement in response to a remove option being selected from the sub-menu.

12. A display control device comprising:

a display control section configured to arrange, on a display, icons for starting each of a plurality of applications, wherein the display includes a designated region in which the icons are able to be arranged;

an acquisition section configured to acquire a number of times of use for each of the applications; and a computation section configured to compute a priority level for each of the applications based on a condition including the number of times of use as acquired by the acquisition section, the display control section being configured to:

effect a rearrangement, in the display, position, during the rearrangement, each icon associated with a high-priority application of the plurality of applications in the designated region, wherein a priority level of each of the plurality of applications is computed by the computation section, maintain a location of any of the icons in the designated region prior to the rearrangement within the designated area following the rearrangement regardless of the priority level of the application of the plurality of applications associated with the any of the icons, in response to receiving a prescribed operation from a user from a user on an icon of the icons, perform control so as to remove the icon subjected to the prescribed operation from the designated region irrespective of a priority level of an application of the plurality of applications associated with the icon, and in response to an unfixed icon of the plurality of the icons being held down, arrange, on the display, a sub-menu including options for fixing the unfixed icon and removing the unfixed icon.

13. The display control device of claim 12, wherein the prescribed operation is an operation of holding down a held-down icon of the icons in order to display an operation screen used to select whether to fix the held-down icon in the designated region or to remove the held-down icon from the designated region and, on the operation screen, selecting whether to fix or remove the held-down icon.

14. The display control device of claim 12, wherein:

the plurality of applications includes at least one application not subject to history management, the at least one application includes an application for performing system settings or emergency calls, and the computation section is configured not to compute the priority level for each of the at least one application.

15. A display control method comprising:

an arranging step of arranging, on a display, icons for starting each of a plurality of applications, wherein the display includes a designated region in which the icons are able to be arranged;

an acquisition step of acquiring a number of times of use for each of the applications;

a computation step of computing a priority level for each of the applications based on a condition including the number of times of use;

a rearranging step of rearranging, in the display, the icons, and, during the rearranging step, positioning each icon associated with a high-priority application of the plurality of applications in the designated region, wherein a priority level of each of the plurality of application is the computed priority level, and maintain a location of any of the icons in the designated region prior to the rearrangement within the designated area following the rearrangement regardless of the priority level of the application of the plurality of applications associated with the any of the icons; and a controlling step comprising:

in response to receiving a prescribed operation from a user on an icon of the icons, of fixing the icon subjected to the prescribed operation so as to be fixed in the designated region irrespective of a priority level of the icon, and in response to a first icon of the plurality of the icons being held down displaying a sub-menu including options for changing a fix status of the first icon.

16. The display control method of claim 15, wherein the controlling step further comprises:

generating the sub-menu including an option to fix a location of the first icon during the rearrangement in response to the fix status of the first icon being unfixed.

17. The display control method of claim 16, wherein the controlling step further comprises:

fixing the location of the first icon during the rearrangement in response to a fix option being selected from the sub-menu.

18. The display control method of claim 16, wherein the controlling step further comprises:

generating the sub-menu including an option to unfix the location of the first icon during the rearrangement in response to the fix status of the first icon being fixed.

19. The display control method of claim 18, wherein the controlling step further comprises:

unfixing the location of the first icon during the rearrangement in response to an unfix option being selected from the sub-menu.

20. A non-transitory computer-readable storage medium storing a program to cause a computer to execute processing comprising:

an arranging step of arranging, on a display, icons for starting each of a plurality of applications, wherein the display includes a designated region in which the icons are able to be arranged;

an acquisition step of acquiring a number of times of use for each of the applications;

a computation step of computing a priority level for each of the applications based on a condition including the number of times of use; and a rearranging step of rearranging, in the display, the icons, and, during the rearranging step, positioning each icon associated with a high-priority application of the plurality of applications in the designated region, wherein a priority level of each of the plurality of application is the computed priority level, and maintaining a location of any icon of the icons in the designated region prior to the rearranging step within the designated region following the rearranging step regardless of the priority level of the application of the plurality of applications associated with the any of the icons; and a controlling step comprising:

in response to receiving a prescribed operation from a user on an icon of the icons, fixing the icon subjected to the prescribed operation so as to be fixed in the designated region irrespective of a priority level of an application of the plurality of applications associated with the icon, and in response to an unfixed icon of the plurality of the icons being held down displaying a sub-menu including options for fixing the unfixed icon and removing the unfixed icon.

* * * * *